LE ROY BAKER.
PROCESS OF MAKING PIGMENTS.
APPLICATION FILED AUG. 13, 1920.
1,425,437.
Patented Aug. 8, 1922.
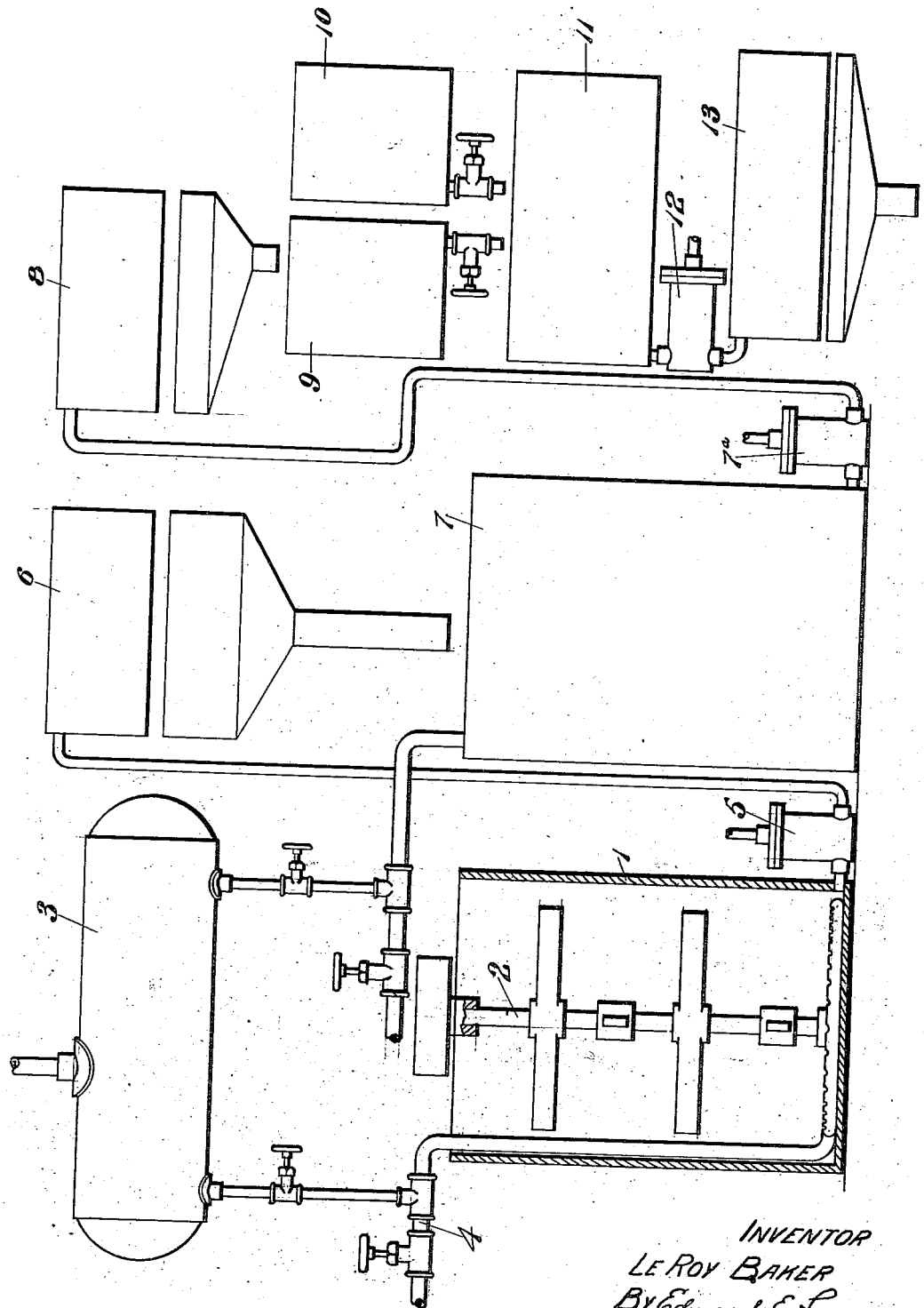
INVENTOR
LE ROY BAKER
BY Edward E Longan
ATTY.

UNITED STATES PATENT OFFICE.

LE ROY BAKER, OF ST. LOUIS, MISSOURI.

PROCESS OF MAKING PIGMENTS.

1,425,437. Specification of Letters Patent. Patented Aug. 8, 1922.

Original application filed July 16, 1919, Serial No. 311,296. Divided and this application filed August 13, 1920. Serial No. 403,209.

*To all whom it may concern:*

Be it known that I, LE ROY BAKER, a citizen of the United States, and resident of St. Louis, and State of Missouri, have invented certain new and useful Improvements in the Processes of Making Pigments, of which the following is a specification containing a full, clear, and exact description, reference being had to accompanying drawings, forming a part thereof.

My invention relates to certain new and useful improvements in the process of making pigments and especially relates to making a sun-proof zinc white pigment.

The accompanying drawing illustrates a conventional form of apparatus by means of which my process may be carried out; this application being a division of my application filed July 16th, 1919, Serial No. 311,296.

In carrying out my process I place a solution of commercial or impure zinc sulphate in the tank 1, in which is located a mechanical agitator 2, and the tank 1 is connected with a source of compressed air supply 3 and with a source of steam supply through the valve controlled steam inlet pipe 4.

The zinc sulphate solution contained in tank 1 is heated with steam at or near the boiling point. After the solution has been heated by steam, or by any other suitable agency, I admit air under pressure into the solution from the compressed air tank 3. By means of this bubbles of air are blown through the solution. The purpose of heating the zinc sulphate solution is to make it more active and more susceptible to the oxygen in the air bubbles.

During the time the zinc sulphate solution is being treated with steam and compressed air, I add to the zinc sulphate solution a metallic peroxide (such as calcium or barium) in powdered form, in sufficient quantity to remove the iron present, and I also add to the solution a monoxide (such as zinc oxide or lead oxide) in powdered form, and in the proportion of about one per cent by weight of the zinc sulphate in the solution, it being understood, of course, that I can add any other suitable metallic monoxide. It will be noted in this connection that barium peroxide will precipitate iron, either hot or cold from solutions containing it. Some basic ferric sulphate is formed. Barium peroxide is only slightly decomposed by boiling water, unless a long time or a concentrated amount is taken. Such decomposition throws down zinc hydrate from the zinc sulphate solution, which in turn reacts with iron sulphate. After the foregoing treatment, by means of a pump such as 5, I transfer the solution from the tank 1 into the filter press 6 for the purpose of removing the iron oxide which has been precipitated from the iron sulphate contained as an impurity in the zinc sulphate solution, and then conduct the filter pressed solution into another tank 7 which is also connected with a steam and compressed air supply. After the solution has reached tank 7 I subject it to the same treatment that it was subjected to in tank 1, and then transfer this solution by pump $7^a$ to another filter press 8, and from this filter press the solution is transferred to tank 9 or storage tank, the zinc oxide having passed into the hydrated form, passes through the filter with the liquor as a fine silky precipitate.

I then take a solution of barium sulphide contained in the tank such as 10 and allow the treated solution in tank 9 and the barium solution in tank 10 to flow into a mixing tank 11. In this tank 11 the treated sulphate solution and the barium solution are mixed together. This precipitates the sulphate solution as the two metallic salts mutually precipitate each other.

After this operation, I take the solution from tank 11 and transfer it by means of a pump 12 into another filter press 13. After this the filter pressed precipitated pigment is washed, dried, calcined, quenched in cold water, ground wet, again washed and again filter pressed, then dried and packed for the market.

I have discovered by experiment that in the manufacture of pigments wherein a metallic peroxide is used alone that the batch of pigment was not sun-proof. I further discovered that by adding a monoxide which precipitates zinc in a hydrated form that the pigment was permanent under all light conditions.

Having fully described my invention what I claim is:

1. The process of making pigments which consists in subjecting a solution of zinc sulphate to the action of air under pressure and steam in the presence of a slightly soluble metallic peroxide and a lead mono-oxide filter pressing said solution, and lastly precipitating said solution with a solution of barium sulphide.

2. The process of making pigments which consists in treating a solution of zinc sulphate with heat and a lead mono-oxide; filter pressing the solution thus treated for removing the lead sulphate present, and precipitating the solution thus formed with a solution of barium sulphide.

3. The herein described process of making pigments which consists in precipitating a solution of pure zinc sulphate with a solution of barium sulphide in the presence of zinc hydrate.

In testimony whereof, I have signed my name to this specification.

LE ROY BAKER.